(12) United States Patent
Revach (10) Patent No.: US 9,109,975 B2
(45) Date of Patent: Aug. 18, 2015

(54) APPARATUS FOR MEASURING BACKLASH IN SPECIMEN GEAR

(71) Applicant: Caterpillar Inc., Peoria, IL (US)

(72) Inventor: Sam S. Revach, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 304 days.

(21) Appl. No.: 13/855,042

(22) Filed: Apr. 2, 2013

(65) Prior Publication Data

US 2014/0290084 A1  Oct. 2, 2014

(51) Int. Cl.
G01B 21/02 (2006.01)
G01M 13/02 (2006.01)

(52) U.S. Cl.
CPC .............. *G01M 13/021* (2013.01); *G01B 21/02* (2013.01)

(58) Field of Classification Search
CPC ............. G01B 5/20; G01B 3/12; G01B 21/02
USPC ............... 33/701, 706, 501.13, 501.15, 501.7
See application file for complete search history.

(56) References Cited

U.S. PATENT DOCUMENTS

| | | | |
|---|---|---|---|
| 3,044,176 A * | 7/1962 | Richmond et al. | 33/501.19 |
| 5,689,993 A * | 11/1997 | Matsumoto | 33/501.19 |
| 5,901,454 A * | 5/1999 | Stadtfeld et al. | 33/501.13 |
| 6,766,686 B2 | 7/2004 | Greubel | |
| 7,228,643 B2 * | 6/2007 | McGlasson | 33/645 |
| 2006/0254055 A1 | 11/2006 | Sabourin | |
| 2009/0249633 A1* | 10/2009 | Patrick et al. | 33/501.19 |
| 2011/0232116 A1* | 9/2011 | Nagata | 33/501.13 |
| 2014/0290084 A1* | 10/2014 | Revach | 33/701 |

FOREIGN PATENT DOCUMENTS

| | | |
|---|---|---|
| FR | 2958028 | 9/2011 |
| JP | 57166508 | 10/1982 |
| JP | 58143210 | 8/1983 |
| JP | 2221839 | 9/1990 |
| JP | 4070541 | 3/1992 |
| JP | 2005249628 | 9/2005 |
| JP | 2006317310 | 11/2006 |
| JP | 2008248928 | 10/2008 |

* cited by examiner

*Primary Examiner* — Yaritza Guadalupe-McCall (57) ABSTRACT

An apparatus for measuring a backlash in a specimen gear is provided. The apparatus includes a test gear mounted on a forward portion of a spindle, the test gear is configured to mesh with the specimen gear and form an electrical circuit upon contact with the specimen gear. An encoder is rotatably connected to the spindle and configured to output a rotation angle of the spindle. An interrupt unit is configured to detect an opening and closing of the electrical circuit and generate one or more interrupt signals based on the opening and the closing of the electrical circuit. A measuring unit is operatively coupled to the encoder and the interrupt unit, the measuring unit is configured to start measurement, and stop measurement of backlash based on the interrupt signal.

18 Claims, 6 Drawing Sheets

APPARATUS FOR MEASURING BACKLASH IN SPECIMEN GEAR

TECHNICAL FIELD

The present disclosure relates to an apparatus for measuring backlash in a specimen gear, and more particularly to an apparatus for measurement of backlash in a ring gear of an engine.

BACKGROUND

Backlash is a linear distance between two gears in mesh and is measured perpendicular to a gear tooth at a pitch diameter of one of the meshed gears. Measurement systems for measuring backlash may be constructed for use in open spaces and where it is not difficult to plant testing equipment in such open spaces. However, in some situations, measuring backlash in a gear may be difficult when the gear is located in closed or confined spaces, such as a ring gear disposed within a housing of an engine. Further, conventional measurement systems constructed for use in such applications may be bulky, cumbersome, and difficult to handle while taking measurements of backlash accurately.

JP Published Application 2006-317310 relates to an inspecting apparatus equipped with a driving mechanism for rotating a crankshaft, and an engagement adjusting mechanism for adjusting the engagement state of the crank gear and a balancer gear. The engagement adjusting mechanism adjusts them alternatively in directions being a driven direction in which rotation is performed by the crank gear, and its reverse-driven direction. The inspecting apparatus further comprises rotation angle detecting means which detect rotation angles of shafts respectively, and a thrust displacement measuring means which detects a movement of a balancer shaft in the axial direction. The engagement state of the crank gear and the balancer gear is adjusted during a period of prescribed rotation number in the driven direction, and then the direction is changed into the reverse-driven direction, and a backlash between the crank gear and the balancer gear is calculated based on displacement values measured by respective rotational angle detecting means and the thrust displacement measuring means.

SUMMARY OF THE DISCLOSURE

In one aspect, the present disclosure provides an apparatus for measuring backlash in a specimen gear. The apparatus includes a test gear mounted on a forward portion of a spindle, an encoder, an interrupt unit, and a measuring unit. The test gear is configured to mesh with the specimen gear and form an electrical circuit upon contact with the specimen gear. The encoder is rotatably connected to the spindle. The encoder is configured to output a rotation angle of the spindle. The interrupt unit is configured to detect an opening and closing of the electrical circuit. The interrupt unit generates one or more interrupt signals based on the opening and the closing of the electrical circuit. The measuring unit is operatively coupled to the encoder and the interrupt unit. The measuring unit is configured to start measurement, and stop measurement of backlash based on the interrupt signal.

In another aspect, the present disclosure provides a method of measuring backlash in a ring gear of an engine. The method includes meshing a test gear with the ring gear such that the test gear is configured to form an electrical circuit upon contact with the ring gear. The method further includes rotating the test gear with respect to the ring gear such that test gear loses contact with a tooth on the ring gear and opens the electrical circuit. The method further includes starting measurement of backlash upon opening of the electrical circuit. The method further includes rotating the test gear with respect to the ring gear such that test gear contacts an adjacent tooth of the ring gear and closes the electrical circuit. The method further includes stopping measurement of backlash upon closing of the electrical circuit.

Other features and aspects of this disclosure will be apparent from the following description and the accompanying drawings.

DETAILED DESCRIPTION

Figure 1:
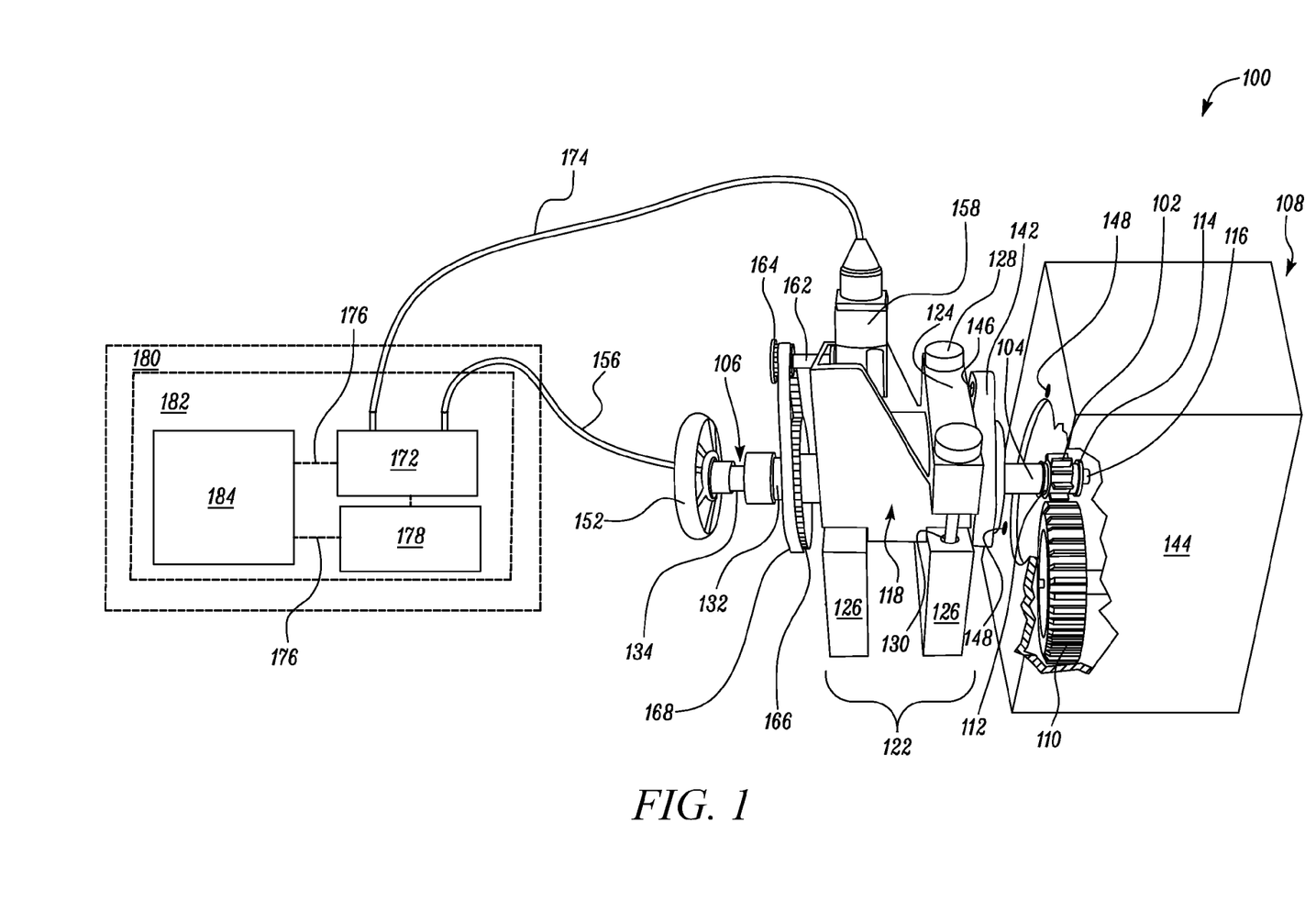
FIG. 1 is a perspective view of an apparatus for measuring backlash in a specimen gear.

The present disclosure relates to an apparatus for measuring backlash in a specimen gear. FIG. 1 illustrates a perspective view of an apparatus 100 including a test gear 102 mounted on a forward portion 104 of a spindle 106. In an embodiment, the test gear 102 may be a pre-calibrated gear manufactured for testing or measuring purposes. The pre-calibrated gear may be manufactured to known dimensions corresponding to meshing requirements in a given application. The pre-calibrated gear may be manufactured using materials different from that for gears manufactured during production such that the pre-calibrated gear is imparted with properties of resistance to wear and dimensional deterioration over time and use.

However, in an alternative embodiment, the test gear 102 may also be a gear substantially identical to a pinion gear of a starter motor that is configured to start an engine 108. Thus, in one embodiment, the test gear 102 may be selected from a sample lot manufactured during production of pinion gears.

In an embodiment as shown in FIG. 1, the specimen gear 110 may be a ring gear disposed within the engine 108. The test gear 102 is configured to mesh with the specimen gear 110. Although the ring gear of the engine 108 is disclosed herein, and the apparatus 100 is shown and described in conjunction with the ring gear of the engine 108, it is to be noted that the ring gear and the engine 108 are merely exemplary in nature and hence, non-limiting of this disclosure. The apparatus 100 may be used to measure backlash in any type of specimen gear 110.

In an embodiment, the apparatus 100 further includes a pair of centering elements 112 slideably mounted on the forward portion 104 of the spindle 106. The centering elements 112 are configured to dispose the test gear 102 substantially parallel to the specimen gear 110. In one embodiment, the centering elements 112 may be a pair of cones disposed on either side of the test gear 102. However, in other embodiments, the centering element may be any type of structure disposed on either side of the test gear 102 to keep the test gear 102 parallel to the specimen gear 110. Further, as shown in FIGS. 1 and 2, the forward portion 104 of the spindle 106 is configured to receive a washer 114 and a nut 116 to fixedly dispose the centering elements 112 on the spindle 106.

In an embodiment, the apparatus 100 further includes a body 118 defining a cavity 120 therethrough. In an embodiment, the body 118 and the spindle 106 are electrically conductive and may be made from aluminum or any other electrically conductive material commonly known in the art.

In an embodiment as shown in FIG. 1, the apparatus 100 may further include a cradle 122. The cradle 122 includes an upper section 124, and a lower section 126. The body 118 may be clamped between the upper and the lower sections 124, 126 of the cradle 122 using threaded fasteners 128 and threaded receptacles 130. The threaded fasteners 128 may be positioned into the upper section 124 and threaded into the threaded receptacles 130 disposed in the lower section 126. Further, the upper and the lower sections 124, 126 are electrically non-conductive and may be made from thermoplastic polymers or any other electrically non-conductive material.

Figure 2:
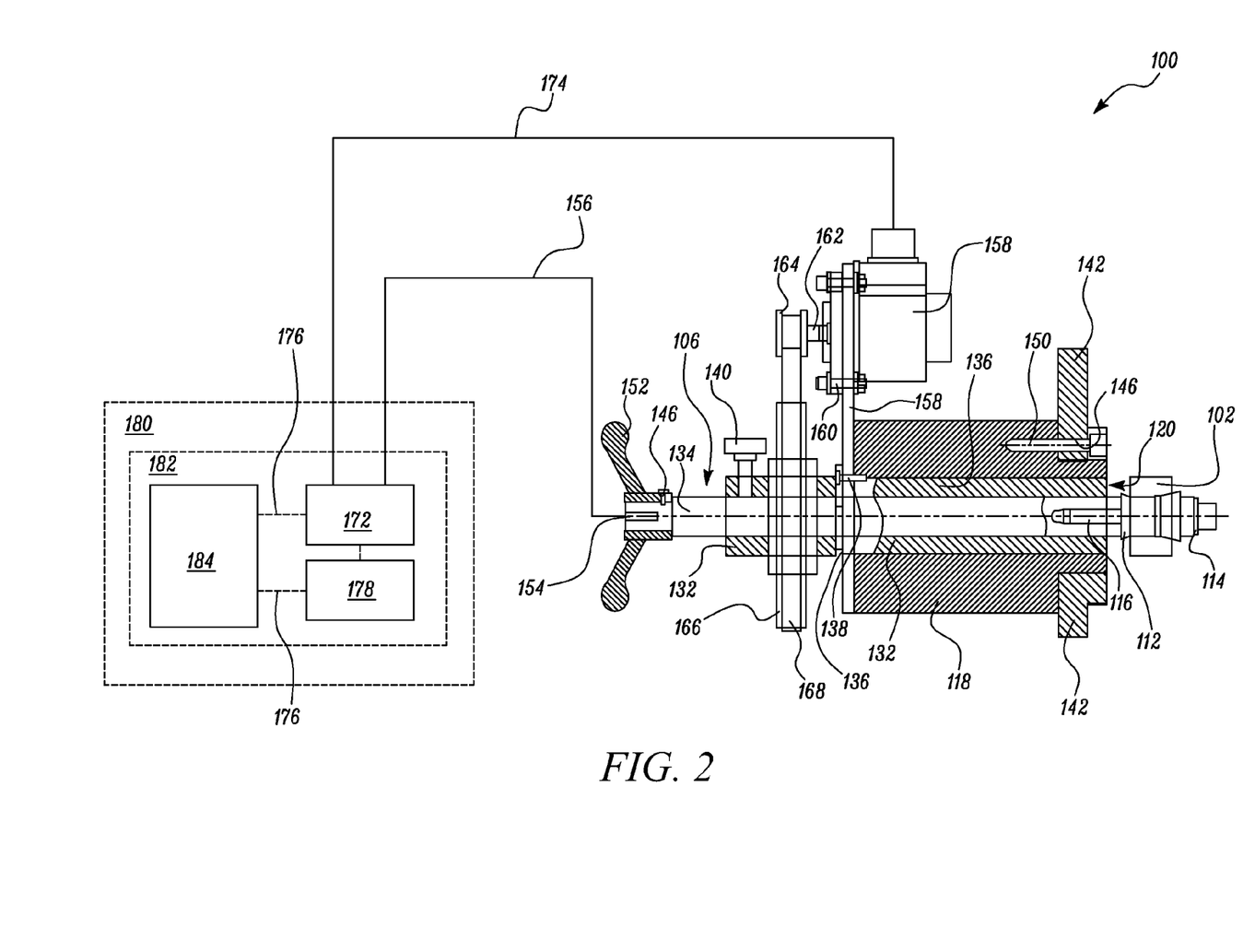
FIG. 2 is a sectional view of the apparatus of FIG. 1.

In one embodiment as shown in FIG. 2, the body 118 may include a sleeve 132 disposed within the cavity 120. In an embodiment, a length of the sleeve 132 may extend beyond the cavity 120 towards the forward portion 104, and a rearward portion 134 of the spindle 106. Further, the sleeve 132 may include a groove 136 at the rearward portion 134 of the spindle 106. A key 138 is configured to secure the sleeve 132 to the body 118 such that an axial displacement of the sleeve 132 with respect to the body 118 may be limited. The sleeve 132 is configured to slideably receive the spindle 106. The relative position of the spindle 106 and the sleeve 132 may be adjusted by tightening a locking screw 140 disposed on the sleeve 132. Further, the sleeve 132 may be made of an electrically non-conductive material commonly known in the art such as thermoplastic polymers. The material of the sleeve 132 may be selected such that the material possesses a low co-efficient of friction. The low-co-efficient of friction may allow the spindle 106 to be smoothly rotated with respect to the sleeve 132.

However, in alternative embodiments, one or more bearings may be used to rotatably support the spindle 106 in the cavity 120. The bearings may be made of any non-conductive material such as ceramic to offer the previously mentioned properties of the sleeve 132.

In an embodiment, the apparatus 100 may further include a flange 142. The flange 142 is removably mounted on the sleeve 132 at the forward portion 104 of the spindle 106. The flange 142 is configured to rigidly attach the apparatus 100 to an engine body 144. Further, the flange 142 may include threaded receptacles 146 located such that the threaded receptacles 146 are configured to correspond to threaded receptacles 148 on the engine body 144. One or more threaded fasteners 150 may be engaged to the threaded receptacles 146, 148 such that the flange 142 and the engine body 144 are releasably fastened to adjust a distance between the test gear 102 and the specimen gear 110.

In an embodiment as shown in FIG. 2, the apparatus 100 further includes a handle 152 rigidly connected at the rearward portion 134 of the spindle 106. The handle 152 is configured to operatively rotate the spindle 106, and the test gear 102 mounted thereon. In a further embodiment, the handle 152 may include an electrical port 154 therein. The electrical port 154 is configured to dispose the spindle 106 in electrical communication with an electrical energy source using an electrical lead 156. In an embodiment, the electrical energy source may be a battery or any other electrical energy source as commonly known.

The apparatus 100 further includes an encoder 158. In an embodiment, the encoder 158 may be mounted on the body 118 using fasteners 160. The encoder 158 is rotatably connected to the spindle 106. In an embodiment, the encoder 158 includes a shaft 162 rotatably connected to the spindle 106. In an embodiment as shown in FIGS. 1 and 2, the apparatus 100 may further include a pair of toothed wheels 164, 166 and a toothed belt 168. The toothed wheels 164, 166 may be mounted on the sleeve 132 at the rearward portion 134 of the spindle 106, and the shaft 162 of the encoder 158 respectively. The toothed belt 168 may be looped over the toothed wheels 164, 166 and accomplish a rotatable connection between the spindle 106 and the encoder 158.

The encoder 158 is configured to output a rotation angle of the spindle 106. In one embodiment, the encoder 158 may be an optical encoder. In another embodiment, the encoder 158 may be an electrical resolver. However, any suitable type of encoder commonly known in the art may be used for measuring the rotation angle of the spindle 106.

Upon rotating the handle 152, the spindle 106 and the test gear 102 may rotate relative to the specimen gear 110. Thus, the shaft 162 on the encoder 158 may be rotatably driven by the toothed wheels 164, 166 and the toothed belt 168. Rotation of the shaft 162 initiates a measurement of the rotation angle of the spindle 106 within the encoder 158.

The test gear 102 is configured to form an electrical circuit 170 upon contact with the specimen gear 110. Although meshing and contacting are disclosed separately herein, it is to be noted that the meshing of the test gear 102 with the specimen gear 110 represents a placement of the test gear 102 adjacent to the specimen gear 110 such that one or more teeth on the test gear 102 alternate with one or more teeth on the specimen gear 110. However, contact between the test gear 102 and the specimen gear 110 refers to a physical contact between the test gear 102 and a tooth of the specimen gear 110.

In an embodiment, the apparatus 100 further includes an interrupt unit 172. As shown in FIGS. 1 and 2, the interrupt unit 172 is disposed in electrical communication with the spindle 106 and the encoder 158. In an embodiment, the interrupt unit 172 is electrically connected to the encoder 158 by a wire harness 174. The interrupt unit 172 is configured to detect an opening and closing of the electrical circuit 170 and generate one or more interrupt signals 176 indicative of the opening, and the closing of the electrical circuit 170.

In an embodiment, the apparatus 100 further includes a measuring unit 178. The measuring unit 178 is connected to the encoder 158 and the interrupt unit 172. The measuring unit 178 is configured to start measurement, and stop measurement of backlash based on one or more of the interrupt signals 176.

In an embodiment, the measuring unit 178, and the interrupt unit 172 may reside on a machine readable medium 180 having a computer program product 182. The computer program product 182 disclosed herein may be a computer executable code configured to be executed by commonly known processors in the art. Further, the machine readable medium 180 disclosed herein may embody a general purpose computer having a storage device such as but not limited to a hard disk, a pen drive, disk drive, computer floppies, and the like. Thus, any commonly known software and hardware elements may be suitably modified or programmed to include and execute the computer program product 182 thereon.

The interrupt unit 172 may power the electrical lead 156 connecting the interrupt unit 172 to the spindle 106. When current passes through the electrical lead 156, it flows to the test gear 102 via the spindle 106. Upon contact of the test gear 102 to the specimen gear 110, the engine body 144, the flange 142, the body 118 of the apparatus 100 and the encoder 158 close the electrical circuit 170 at the interrupt unit 172 via the wire harness 174. In one embodiment as shown in FIGS. 1 and 2, the electrical lead 156 may be a universal serial bus connector, and the interrupt unit 172 residing on the machine readable medium 180 such as the general purpose computer, disclosed herein, may power the electrical lead 156 with a direct current (DC) having a small voltage, for example, 5V DC.

In one embodiment, the apparatus 100 may also include an assist unit 184 residing on the computer program product 182. The assist unit 184 is connected to the interrupt unit 172 and the measuring unit 178, and is configured to display operating instructions relating to rotation of the test gear 102 with respect to the specimen gear 110. Although the assist unit 184 disclosed herein is configured to display operator readable instructions, any type of assist unit 184 commonly known in the art may be pre-set with the operating instructions and configured to relay the pre-set operating instructions to an operator during operation of the apparatus 100. Some examples of assist units commonly known in the art are light emitting diodes (LED), and sound emitters.

In one embodiment, the assist unit 184 may display operating instructions to rotate the test gear 102 in a clockwise direction such that the test gear 102 contacts a first tooth 186 on the specimen gear 110. In another embodiment, the assist unit 184 may display operating instructions to turn the test gear 102 in a counter-clockwise direction such that the test gear 102 contacts a second tooth 188 on the specimen gear 110 adjacent to the first tooth 186 of the specimen gear 110.

Explanation to the operation of the apparatus 100 during measurement, and the respective functions of the assist unit 184, the encoder 158, the interrupt unit 172, and the measuring unit 178 will be made in the appended disclosure. However, it is to be noted that a manner of operating the apparatus 100 and the respective functions of the various parts therein are merely exemplary in nature and hence, should not be construed as limiting to the specific embodiments of the foregoing disclosure.

Figure 3:
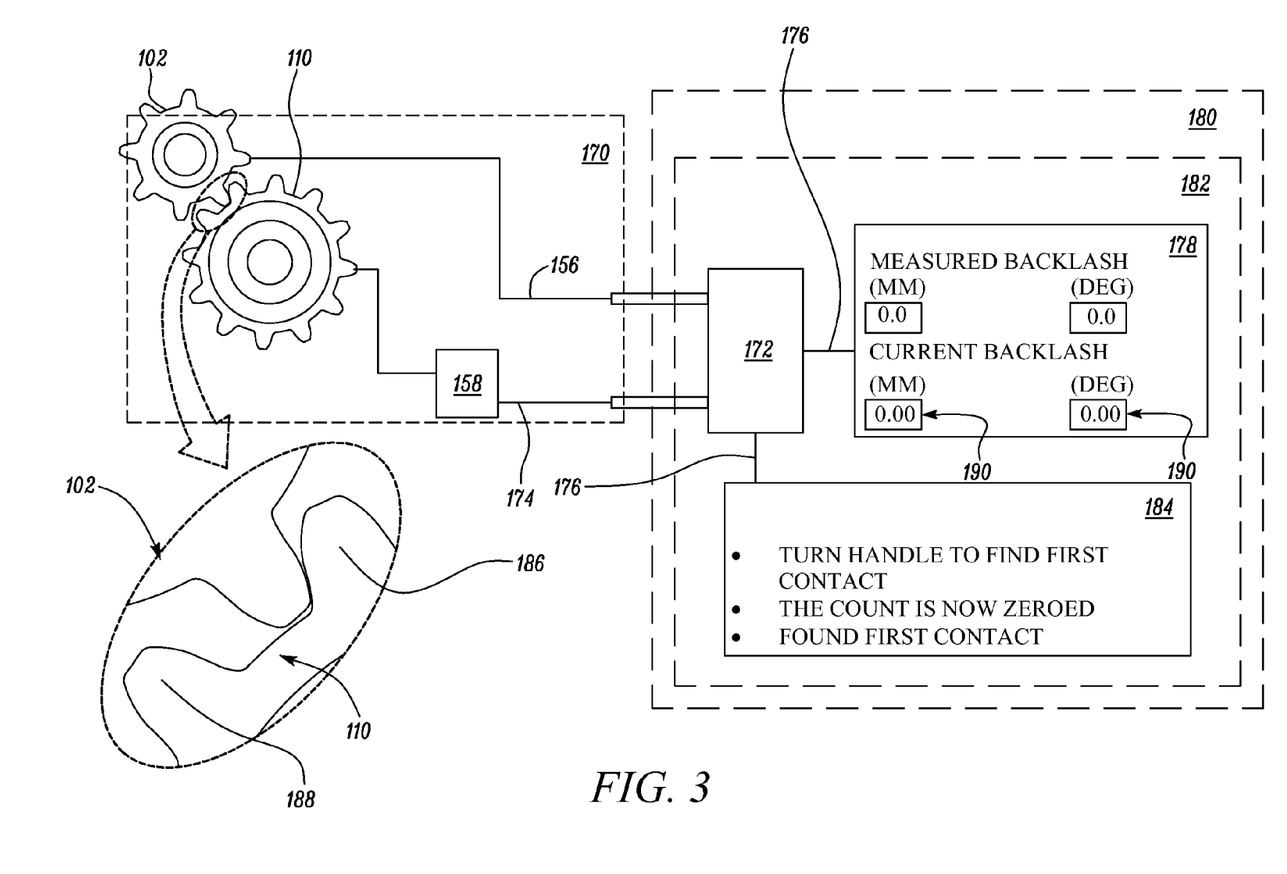
FIGS. 3-5 are various stages in measurement of backlash using the apparatus of FIG.1.

To initiate a process of measurement of backlash, the assist unit 184 displays an operating instruction for rotating the spindle 106 such that a contact between the test gear 102 and the first tooth 186 of the specimen gear 110 occurs. As shown in FIG. 3, the test gear 102 is rotated to contact the first tooth 186 of the specimen gear 110 thus closing the electrical circuit 170. At this point, the interrupt unit 172 generates a first interrupt signal 176 indicative of the closing of the electrical circuit 170. Further, the measuring unit 178 receives the first interrupt signal 176 from the interrupt unit 172 and the rotation angle of the spindle 106 from the encoder 158. The measuring unit 178 then sets an absolute reference value of backlash, for example, 0 degrees, and 0 mm A person having ordinary skill in the art may acknowledge that the encoder 158 rotatably connected to the spindle 106 may output a real-time value of the rotation angle of the spindle 106 irrespective of a state of the electrical circuit 170, that is, closed state or open state. In an embodiment, the encoder 158 may output a non-zero value of the rotation angle of the spindle 106, for example, 2.0 degrees and 0.60 mm, when the electrical circuit 170 is closed. At this point, the measuring unit 178 may set an absolute reference value 190 of backlash, for example, 0.0 degrees, and 0.00 mm Any rotation of test gear 102 from this point will incur counting of backlash value from the absolute reference value 190.

In an embodiment as shown in FIG. 2, the measuring unit 178 may display a current value 192 of backlash in real-time while the spindle 106 is being rotated. Further, the measuring unit 178 also displays an end value 194 of backlash as the rotation of the spindle 106 and the test gear 102 is completed. The aforesaid current value 192 and end value 194 corresponding to various steps in measurement of backlash will be evident upon perusal of the appended disclosure.

In an embodiment as shown in FIG. 2, the assist unit 184 may display a message indicative of the first contact between the test gear 102 and the first tooth 186 of the specimen gear 110. The assist unit 184 may further display a message confirming setting of the absolute reference value 190 by the measuring unit 178 such that any rotation of the spindle 106 away from the first tooth 186 will start a measurement of backlash.

Further, the assist unit 184 displays an operating instruction for rotating the spindle 106 and finding a second contact between the test gear 102 and the second tooth 188 of the specimen gear 110. When the spindle 106 is rotated, the test gear 102 moves away from the first tooth 186 of the specimen gear 110 and this may render the electrical circuit 170 open. The measuring unit 178 starts measurement of backlash from the absolute reference value 190 and may display the current value 192 of backlash corresponding to a rotational position of the spindle 106 away from the first tooth 186.

Figure 4:
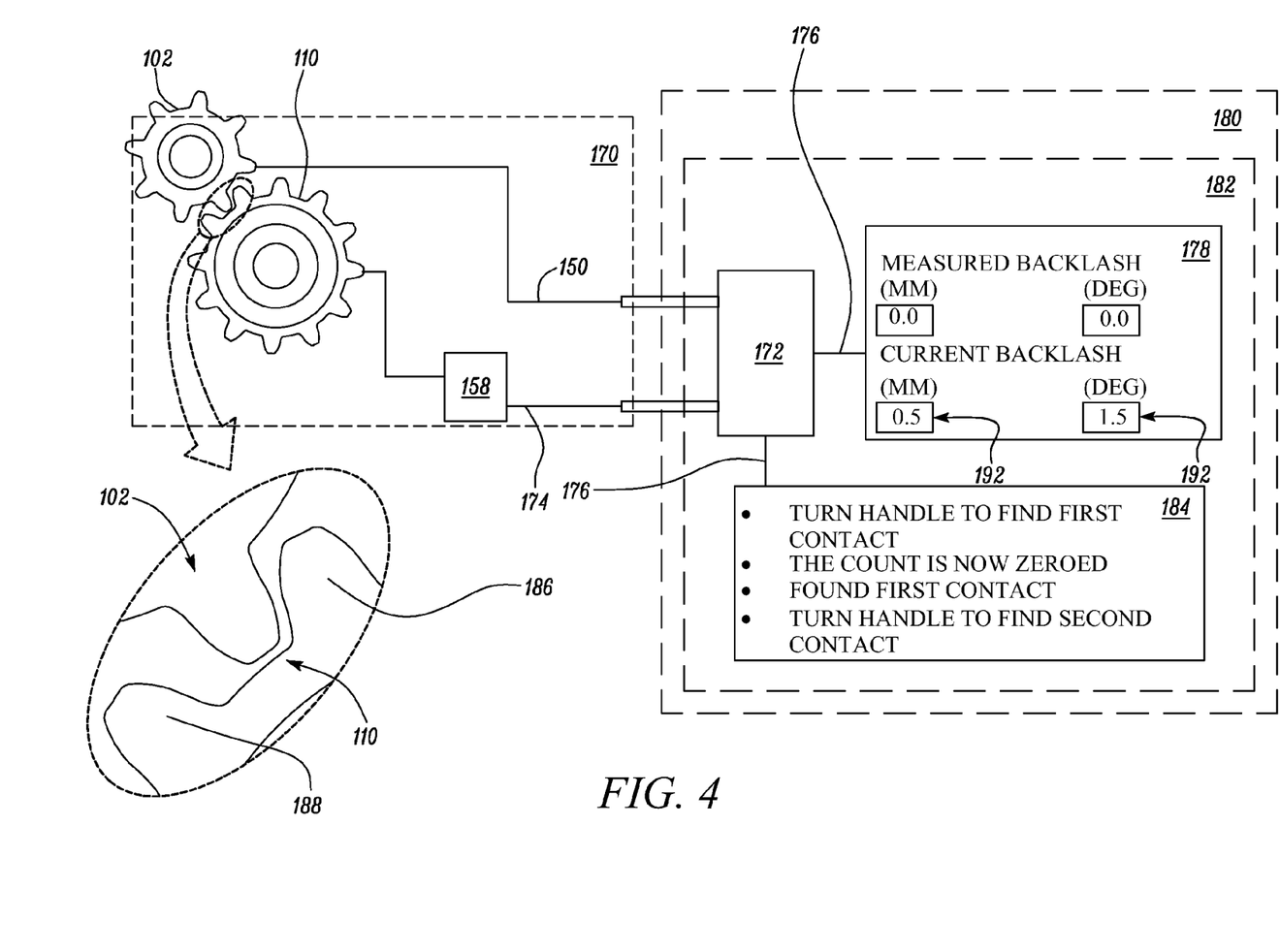
Figure 5:
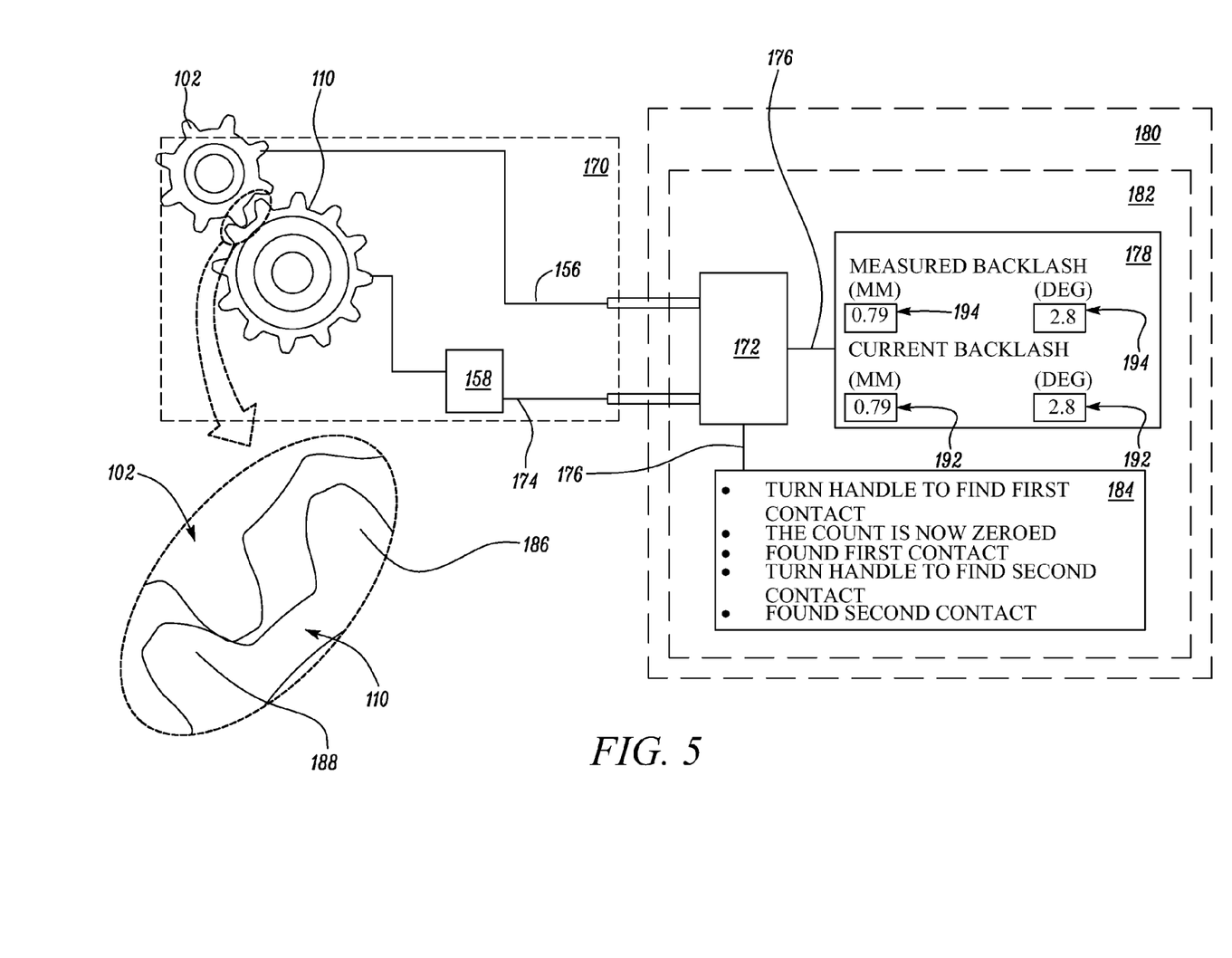
Figure 6:
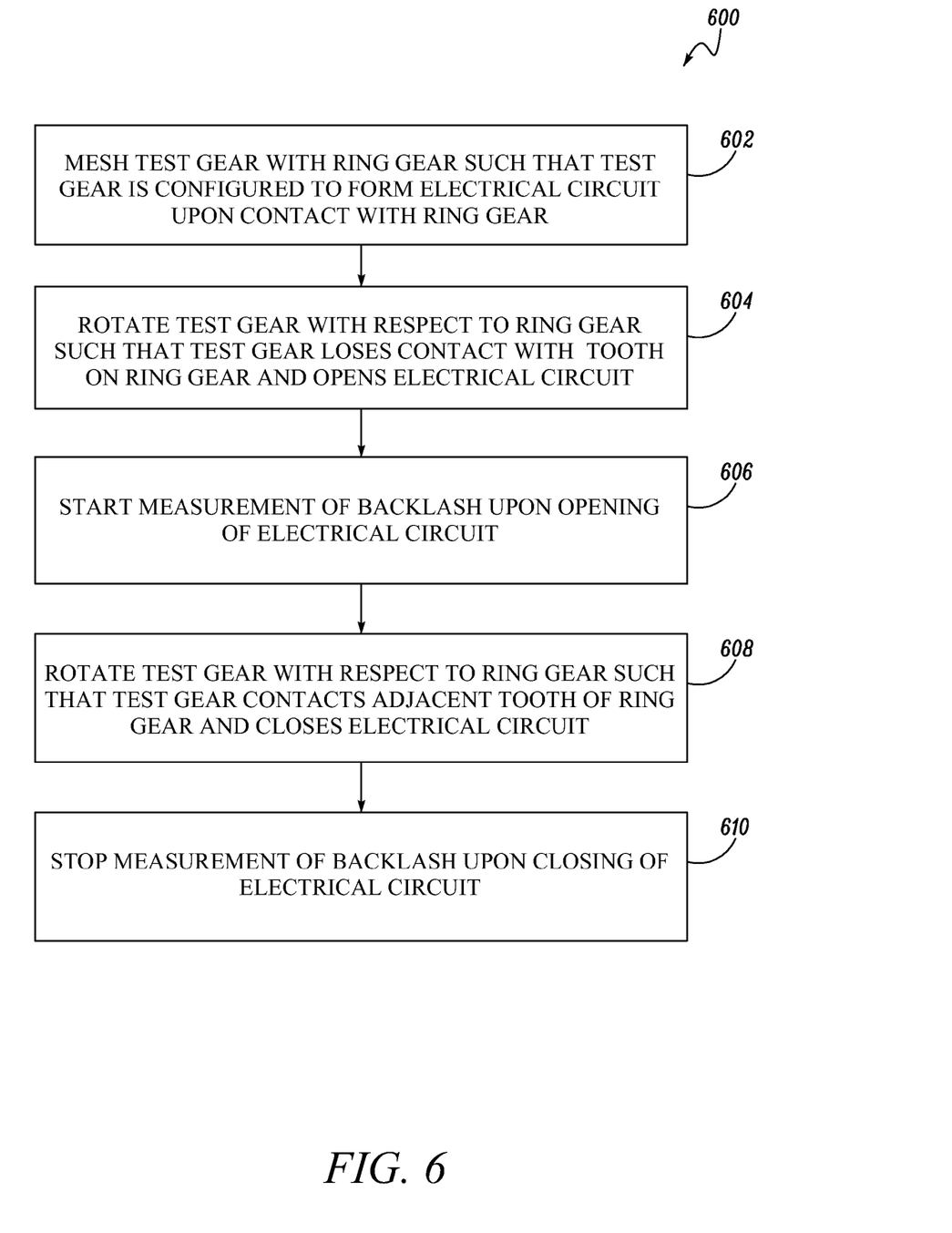
FIG. 6 is a method of measuring backlash.

FIG. 4 shows a position of the test gear 102 between two adjacent teeth of the specimen gear 110. In an exemplary embodiment as shown in FIG. 3, the measuring unit 178 displays the current value 192 of backlash to be at 1.5 degrees and 0.50 mm As shown in FIG. 5, the test gear 102 contacts the second tooth 188 of the specimen gear 110 and hence, renders the electrical circuit 170 to be closed again. The assist unit 184 may now display a message indicative of the second contact between the test gear 102 and the specimen gear 110. The interrupt unit 172 generates a second interrupt signal 176 indicative of the closing of the electrical circuit 170. The measuring unit 178 receives the second interrupt signal 176 and stops measurement of backlash. The measuring unit 178 receives the rotation angle of the spindle 106 from the encoder 158 and displays an end value 194 of backlash of the specimen gear 110 for example, 2.8 degrees, and 0.79 mm Industrial Applicability FIG. 6 shows a method 600 of measuring backlash in a ring gear 110 of an engine 108, At step 602, the method includes meshing a test gear 102 with the ring gear 110 such that the test gear 102 is configured to form an electrical circuit 170 upon contact with the ring gear 110. At step 604, the method further includes rotating the test gear 102 with respect to the ring gear 110 such that test gear 102 loses contact with a tooth on the ring gear 110 and opens the electrical circuit 170. At step 606, the method further includes starting measurement of backlash upon opening of the electrical circuit 170. At step 608, the method further includes rotating the test gear 102 with respect to the ring gear 110 such that test gear 102 contacts an adjacent tooth of the ring gear 110 and closes the electrical circuit 170. At step 610, the method further includes stopping measurement of backlash upon closing of the electrical circuit 170.

In an embodiment, the method further includes generating an interrupt signal 176 based on the opening and the closing of the electrical circuit 170. In an embodiment, the method further includes starting or stopping the measurement of backlash based on the interrupt signal 176. In an embodiment, the method further includes setting an absolute reference value 190 of backlash based an interrupt signal 176 indicative of opening of the electrical circuit 170. In an embodiment, the measurement of backlash is started based on the interrupt signal 176 indicative of opening of the electrical circuit 170. In an embodiment, the measurement of backlash is stopped based on the interrupt signal 176 indicative of closing of the electrical circuit 170.

Backlash is a linear distance between two gears in mesh and is measured perpendicular to a gear tooth at a pitch diameter of one of the meshed gears. Measurement systems for measuring backlash may be constructed for use in open spaces and where it is not difficult to plant a testing equipment in such open spaces. However, in some situations, measuring backlash in a gear may be difficult when the gear is located in closed or confined spaces, such as a ring gear disposed within a housing of an engine.

However, with the apparatus 100 of the present disclosure, the spindle 106, and the test gear 102 rotatably mounted thereon may be easily inserted into the engine body 144 to measure backlash in the ring gear 110. Further, the handle 152 is configured to allow the test gear 102 to be easily rotated relative to the ring gear 110. Furthermore, the toothed belt and wheels, rotatably connecting the encoder 158 to the spindle 106 transfer torque with minimal losses so that measurement of backlash may be accurately taken.

Conventional measurement systems constructed for use in closed spaces may be bulky, cumbersome, and difficult to operate. Furthermore, when particularly measuring backlash in ring gears of engines, many components of the engine such as a housing of the engine may have to be removed in order to access the ring gear and measure the backlash therein.

However, the apparatus 100 of the present disclosure allows an operator to do away with disassembly of the engine body 144 or housing from the engine 108. Thus, the measurement process can be quickly initiated without tedious effort required in disassembly of the engine body 144.

Conventional measurement systems require monitoring angular displacement of multiple gears. Further, Conventional measurement systems may require an operator to rely on manual senses to determine the start and stop positions while measuring backlash. However, with the apparatus 100 disclosed herein, the opening and the closing of the electrical circuit 170 may provide accurate detection of the contact between the test gear 102 and the teeth of the specimen gear 110. Moreover, use of electrical current to sense gear position requires monitoring a single gear. Hence, measurement may be started or stopped distinctively and the end value 194 of backlash may be measured accurately.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

I claim:

1. An apparatus for measuring backlash in a specimen gear, the apparatus including:
   a test gear mounted on a forward portion of a spindle, the test gear configured to mesh with the specimen gear and form an electrical circuit upon contact with the specimen gear;
   an encoder rotatably connected to the spindle and configured to output a rotation angle of the spindle;
   an interrupt unit configured to detect an opening and closing of the electrical circuit and generate one or more interrupt signals based on the opening and the closing of the electrical circuit; and
   a measuring unit operatively coupled to the encoder and the interrupt unit, the measuring unit configured to start measurement, and stop measurement of backlash based on the interrupt signal.

2. The apparatus of claim 1 further including:
   a cradle including at least an upper section, and a lower section;
   a body clamped between the upper and lower sections, the body defining a cavity therethrough; and
   a sleeve disposed within the cavity, the sleeve configured to slideably receive the spindle.

3. The apparatus of claim 2, wherein the body, and the spindle are of an electrically conductive material, wherein the sleeve is of an electrically non-conductive material.

4. The apparatus of claim 1 further including a handle rigidly connected at a rearward portion of the spindle, the handle configured to operatively rotate the spindle and the test gear.

5. The apparatus of claim 4, wherein the handle includes an electrical port, the electrical port configured to dispose the spindle in electrical communication with an electrical energy source.

6. The apparatus of claim 1 further including a pair of centering elements slideably mounted on the spindle and disposed on either side of the test gear, the centering elements configured to dispose the test gear substantially parallel to the specimen gear.

7. The apparatus of claim 1 further including a flange removably mounted on the spindle, the flange configured to attach the apparatus to an engine body.

8. The apparatus of claim 1, wherein the measuring unit is further configured to set an absolute reference value of backlash based on the interrupt signal indicative of an existing closed electrical circuit.

9. The apparatus of claim 1, wherein the measuring unit is configured to start measurement of backlash based on the interrupt signal indicative of opening of the electrical circuit.

10. The apparatus of claim 1, wherein the measuring unit is configured to stop measurement of backlash based on the interrupt signal indicative of closing of the electrical circuit.

11. The apparatus of claim 1, wherein the interrupt unit and the measuring unit reside on a machine readable medium having a computer program product.

12. The apparatus of claim 1 further including an assist unit configured to display operating instructions relating to rotation of the test gear with respect to the specimen gear.

13. A method of measuring backlash in a ring gear of an engine, the method comprising:
   meshing a test gear with the ring gear such that the test gear is configured to form an electrical circuit upon contact with the ring gear;
   rotating the test gear with respect to the ring gear such that test gear loses contact with a tooth on the ring gear and opens the electrical circuit;
   starting measurement of backlash upon opening of the electrical circuit;
   rotating the test gear with respect to the ring gear such that test gear contacts an adjacent tooth of the ring gear and closes the electrical circuit; and
   stopping measurement of backlash upon closing of the electrical circuit.

14. The method of claim 13 further including generating an interrupt signal based on the opening and the closing of the electrical circuit.

15. The method of claim 14 further including starting or stopping measurement of backlash based on the interrupt signal.

16. The method of claim 14 further including setting an absolute reference value of backlash based an interrupt signal indicative of opening of the electrical circuit.

17. The method of claim 14, wherein measurement of backlash is started based on the interrupt signal indicative of opening of the electrical circuit.

18. The method of claim 14, wherein measurement of backlash is stopped based on the interrupt signal indicative of closing of the electrical circuit.

\* \* \* \* \*